United States Patent
Matta et al.

[19]

[11] Patent Number: 5,808,565
[45] Date of Patent: Sep. 15, 1998

[54] GPS TRIGGERED AUTOMATIC ANNUNCIATOR FOR VEHICLES

[75] Inventors: David M. Matta; Andrew M. Kissel, both of State College, Pa.

[73] Assignee: E-Systems, Inc., Dallas, Tex.

[21] Appl. No.: 821,415

[22] Filed: Mar. 21, 1997

Related U.S. Application Data

[60] Provisional application No. 60/011,919 Feb. 20, 1996.

Related U.S. Application Data

[63] Continuation of Ser. No. 604,716, Feb. 21, 1996, abandoned.

[51] Int. Cl.⁶ ................................. G08B 1/123
[52] U.S. Cl. .................. 340/994; 340/995; 340/988; 701/200; 701/208; 701/213
[58] Field of Search ................... 340/994, 995, 340/990, 988, 825.36, 825.49; 701/200, 206, 207, 213, 208

[56] References Cited

U.S. PATENT DOCUMENTS

| | | | |
|---|---|---|---|
| 3,947,807 | 3/1976 | Tyler et al. | 340/992 |
| 4,630,065 | 12/1986 | Ichikawa | 340/995 |
| 4,774,672 | 9/1988 | Tsunoda et al. | 364/449 |
| 4,799,162 | 1/1989 | Shinkawa et al. | 364/436 |
| 4,857,925 | 8/1989 | Brubaker | 340/994 |
| 4,897,642 | 1/1990 | DiLullo et al. | 340/825.06 |
| 5,218,629 | 6/1993 | Dumond, Jr. et al. | 379/59 |
| 5,243,529 | 9/1993 | Kashiwazaki | 364/449 |
| 5,365,449 | 11/1994 | Kashiwazaki | 364/449 |
| 5,394,332 | 2/1995 | Kuwahara et al. | 364/449 |
| 5,400,020 | 3/1995 | Jones et al. | 340/994 |
| 5,410,486 | 4/1995 | Kishi et al. | 364/449 |
| 5,420,794 | 5/1995 | James | 364/436 |
| 5,442,558 | 8/1995 | Kyrtsos | 364/449 |
| 5,444,444 | 8/1995 | Ross | 340/994 |
| 5,469,158 | 11/1995 | Morita | 340/988 |
| 5,541,845 | 7/1996 | Klein | 364/449 |
| 5,550,743 | 8/1996 | Kyrtoss | 364/449 |

*Primary Examiner*—Jeffery A. Hofsass
*Assistant Examiner*—Benjamin C. Lee
*Attorney, Agent, or Firm*—Baker & Botts, L.L.P.

[57] ABSTRACT

An apparatus for automatically announcing the arrival status of a vehicle to occupants of the vehicle. The apparatus stores route identification, trip identification, and destination identification for at least one predetermined route. The destination information includes, for each destination, at least a destination number, destination name, and a set of first and second latitude and first and second longitude coordinates defining a logical box associated with each destination. The apparatus also stores digital information corresponding to an announcement for each destination, inputs an intended route and trip identification at a starting point of the intended route and trip, and has a GPS receiver for determining the present position of the vehicle in latitude and longitude coordinates. The apparatus determines whether the present position of said vehicle in latitude and longitude coordinates is within a particular logical box on said predetermined route and, if so, outputs a digitized voice or visual alphanumeric display of the name of the destination to the occupants of the vehicle.

27 Claims, 9 Drawing Sheets

VEHICLE TRACKING DATABASE

GPS TRIGGERED AUTOMATIC ANNUNCIATOR FOR VEHICLES

CROSS REFERENCE TO RELATED APPLICATION

This is a continuation of application Ser. No. 08/604,716, filed Feb. 21, 1996, which is a converted application of provisional application Ser. No. 60/011,919, filed Feb. 20, 1996, now abandoned.

FIELD OF THE INVENTION

The present invention relates to automatic stop annunciators for vehicles, such as public buses, and in particular relates to an automatic stop annunciator which is triggered to announce the stop in response to the location of the vehicle determined by a GPS receiver.

BACKGROUND OF THE INVENTION

Manually actuated digital voice and alphanumeric visual display annunciators for announcing the stops on a public transportation vehicle, such as a bus, are known. Such annunciators store digital information corresponding to the name of each stop on a route, either as a digitized voice or text of the name, or both. As a vehicle approaches a stop, the driver can push a button to cause the digital voice (or alphanumeric display) to announce the stop. Each time the driver presses the button, the system will increment one stop so that all the stops will be announced in turn. Of course, if a driver neglects to announce one stop, other stops subsequently announced may be in error.

It is desired to automate the triggering of the annunciation of stops. However, automating the announcement of stops, particularly for road vehicles, such as buses, has been difficult, because of the lack of in-place signaling equipment for stops and the variability in traffic conditions.

Some attempts have been made to automatically trigger the display of a next destination on a delivery vehicle, for example, using a GPS receiver. In one such system, U.S. Pat. No. 5,243,529, one-day schedule data representing the location of each destination in terms of a latitude and longitude intersection and its scheduled arrival time is stored in a nonvolatile RAM of a controller (i.e., a computer) on board a vehicle. As the vehicle moves, the controller selects, at predetermined time intervals, the destination information of the destination having the scheduled arrival time close to the present time, among the destinations that have not been reached yet, and displays the name of the next destination on a display screen. Once a destination is reached, as determined by comparing the GPS position data with the location data stored for the scheduled destinations, the display increments to display the next scheduled stop. That is, the display for the next destination is triggered when the last destination is reached, which may be miles from the next destination.

The system of U.S. Pat. No. 5,243,529, while adaptable to delivery vehicles, is not satisfactory for vehicles such as public buses, where stops tend to be close together, and where it is desired to trigger a digital voice announcement of a stop as the stop is being approached.

GPS position data is received by GPS receivers approximately once per second, with an accuracy of within about 30 meters. With city buses, the distance between stops may be as little as 50 meters. At 30 mph, a vehicle travels about 13.4 meters per second. Thus, the error of GPS receivers, added to the distance traveled between position data, can be nearly equal to the distance between stops. Furthermore, obstructions such as buildings and trees can interfere with GPS reception, adding additional error.

SUMMARY OF THE INVENTION

The present invention provides an apparatus for automatically announcing the arrival status of a vehicle to occupants of the vehicle, comprising means for storing route identification, trip identification, and destination identification for at least one predetermined route. The destination information includes, for each destination, at least a destination number, destination name, and a set of first and second latitude and first and second longitude coordinates defining a logical box associated with each destination. The apparatus also includes means for storing digital information corresponding to an announcement for each said destination, means for inputting an intended route and trip identification at a starting point of said intended route and trip, and means including a GPS receiver for determining the present position of the vehicle in latitude and longitude coordinates. The apparatus also includes means for determining whether the present position of said vehicle in latitude and longitude coordinates is within one of said logical boxes on said predetermined route and, if so, selecting the digital information corresponding to an announcement for said destination, and means for outputting the announcement to said occupants.

In accordance with a preferred aspect of this embodiment, the announcement is a visual digital display.

In accordance with another preferred aspect of this embodiment, the announcement is an audio announcement.

In accordance with another preferred aspect of this embodiment, the means for storing scheduling information includes at least a stop time associated with each said destination on a route, means for determining a present time, means for comparing said present time to the time associated with a destination, when said present position of said vehicle is within the logical box corresponding to said destination, and means for outputting an early or late indication based upon a comparison between said stop time and said present time conducted by said means for comparing.

In accordance with another preferred aspect of this embodiment, the early or late indication is transmitted to a central communications center.

In accordance with another preferred aspect of this invention, the early indication is displayed to a driver of said vehicle.

In accordance with yet another preferred aspect of this invention, the apparatus further includes means in communication with a stationary central communications center for periodically resetting said present time to a present time determined by said central communications center.

BRIEF DESCRIPTION OF THE DRAWINGS

These and other objects, features and advantages of the present invention will be clear to those skilled in the art upon review of the following detailed description and drawings, wherein.

DETAILED DESCRIPTION

Figure 1:
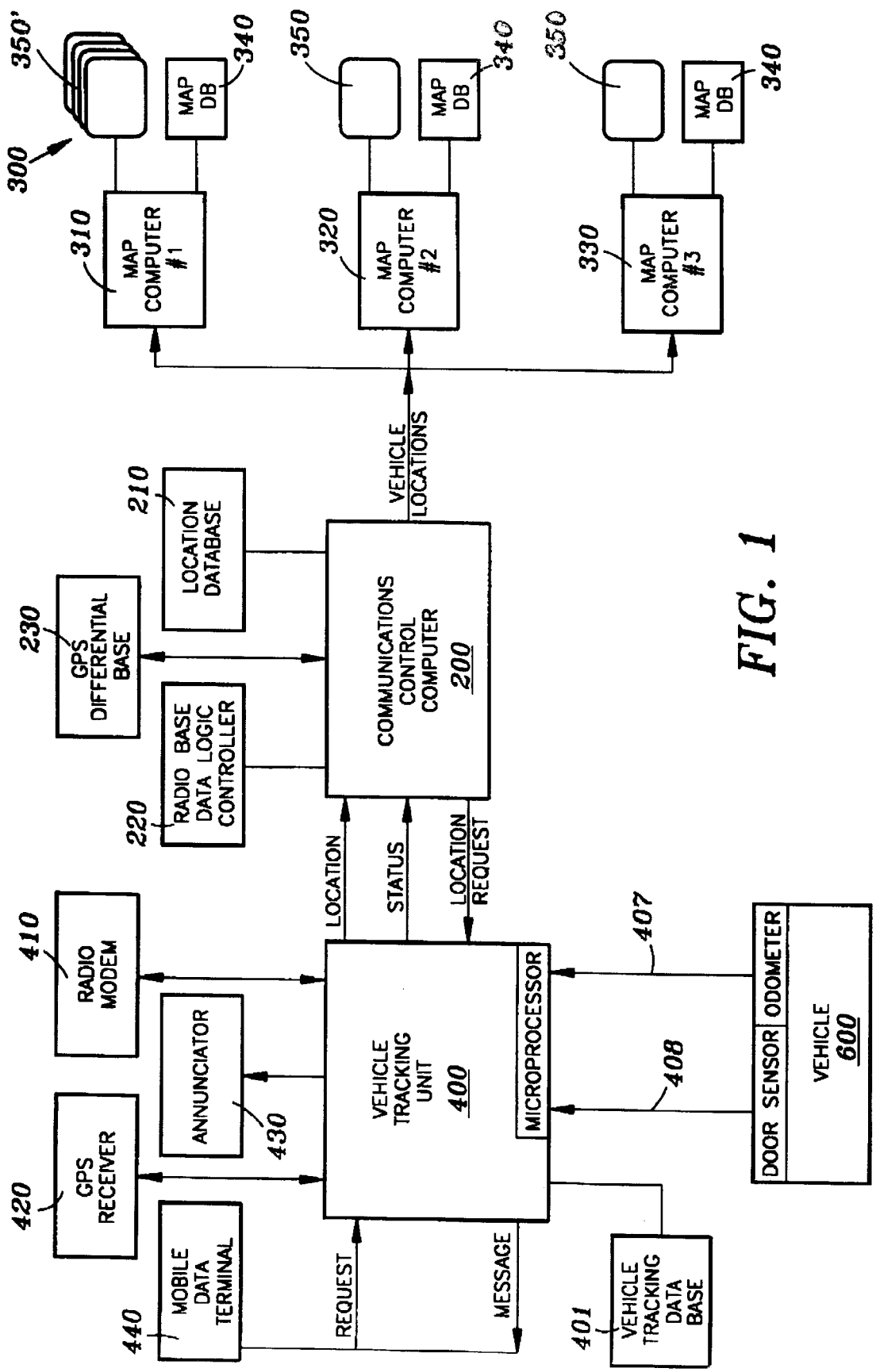
FIG. 1 is a block diagram of an automatic vehicle locating system including the automatic annunciator system of the present invention.

Referring now to the drawings in detail, FIG. 1 depicts a block diagram schematic of the automatic vehicle locating system (AVLS) 100 including the automatic annunciator system of the present invention. The AVLS 100 includes a central communications control center computer (CCC) 200, a map computer subsystem 300, and a plurality of vehicle tracking units (VTU) 400. A single VTU 400 is located on each vehicle of the AVLS 100.

Communications Control Computer

The CCC 200 is a central computer and communications center providing overall system database storage, management and transmission of location and status requests to each vehicle 600 monitored by the system, control of radio frequency voice and data transmissions to and from the vehicles 600, analysis and transmission of vehicle location information received from the VTU's 400 on the vehicles, and generally performs as a host computer for the entire AVLS 100.

The CCC 200 includes a location database 210 stored on a fixed disk or other media storage device. The stored data includes all required route and schedule information for the entire route system, including for each unique route and trip, route ID, route name, trip ID number, vehicle ID's (for each vehicle on the system), run ID or run base time, latitude and longitude data defining each stop or destination on each route, schedule information for each route, including scheduled departure times from each stop, which may be unique for a day of the week, month or year, etc.

The CCC 200 includes a radio frequency base data logic controller (BDLC) 220 for transmitting to, and receiving from, over a radio modem 410 of the vehicle 600, updated location and status information from each VTU 400 located on each vehicle, and for transmitting and receiving other data transmissions to the VTU's, such as emergency signals, digital messages between the dispatchers and the drivers, etc. The BDLC 220 is also preferably capable of transmitting and receiving voice messages.

The CCC 200 preferably includes a differential base GPS system 230, such as a NAVSTAR XRS-M12R differential base. The differential base GPS system 230 transmits a correction signal approximately one every 10 seconds to GPS receivers 420 located on each VTU 400 to improve the accuracy of the GPS location information for each vehicle 600. With the differential base GPS system 230, the accuracy of the GPS location information for each vehicle 600 will be in the range of 5–10 meters.

GPS satellites transmit a universal coordinate time clock signal. This clock signal, adjusted for local time and for daylight savings time, is used by each VTU 400 and the CCC 200 such that all VTU's and the CCC will have a uniform, centrally determined time.

Map Computer Subsystem 300

The map computer subsystem 300 is depicted in FIG. 1 as having three map computers 310, 320 and 330, but may have any number of map computers, depending upon the number of dispatchers operating the ALVS 100. Each map computer 310, 320 and 330 connects to a corresponding map database 340 and displays 350 and 350'. Each map computer 310, 320 or 330 stores the data needed to generate the maps that are illustrated on the respective displays 350 and 350'.

Each map database 340 may be stored on a fixed disk or other media storage device associated with each map computer 310, 320 and 330, or may be centrally stored if the map computers are connected on a network. The map computer subsystem 300 is continually updated with information received from the CCC 200 as to the location of each vehicle 600.

Each map computer subsystem 310, 320 and 330 drives one or more displays 350 or 350', depending upon the requirements of the dispatchers operating the AVLS 100. For example, map computer 310 can drive four map displays 350' simultaneously, each displaying a different map or desired set of data, whereas map computers 320 and 330 each drive only one display 350.

The map computer displays 350 can display an area map, which centers on a place, or a vehicle map, which centers on a particular vehicle. The map computer subsystem 300 can store and replay vehicle data based upon vehicle identification (ID) number, time, date or other parameters monitored by the system. The map computer subsystem 300 monitors the ALVS 100 for updates of vehicle locations and draws new points indicating their positions on all the maps.

The map computer subsystem 300 can also accept database queries from the dispatchers by means of a keyboard (not shown) about the locations of specific vehicles 600 and the on-time status of vehicles, display incoming messages received from the CCC, display incoming messages received from drivers, accept keyed messages from dispatchers for transmission to all the vehicles, or a particular vehicle via the CCC, and in general perform all other input/display functions required by the dispatcher for effectively monitoring vehicle locations and schedule status.

Vehicle Tracking Units

Each vehicle 600 in the AVLS 100 includes a VTU 400. Thus, if there are 30 vehicles, there will be 30 VTU's 400. Each VTU 400 will have a unique ID number associated with it, so that the CCC 200 can identify data transmission from each VTU, and address data transmissions to a particular VTU. Preferably, the unique ID number will be transmitted at the same time as other information (such as location or status information) is transmitted from the VTU 400.

Each VTU 400 includes a radio modem 410 and an associated antennae for transmitting and receiving data signals to and from the CCC through the radio BDLC 220 of the CCC. Each VTU 400 also includes the corresponding GPS receiver 420 for receiving GPS signals from global positioning satellites and providing the location of the GPS receiver in latitude and longitude coordinates. The GPS receiver 420 also receives the GPS correction signal from the GPS differential base 230, to improve the accuracy of the location information from an uncorrected plus or minus about 30 meters, to a corrected plus or minus about 5–10 meters.

Each VTU 400 also includes an annunciator 430 for announcing the next destination or stop of the vehicle. The annunciator 430, which is preferably a commercially available "DR 500" model, includes a speaker and nonvolatile or battery-backed RAM for storing a digitized voice message announcing each stop on a particular route. Each digitized voice message is associated with the ID number associated with a particular stop or destination on a particular route/trip so that it may be selected by the ALVS 100 for announcement at the appropriate time in the manner to be described. The annunciator 430, in addition to announcing a digitized voice message, can also optionally be interfaced to an alpha-numeric visual display within the vehicle 600 for displaying the announced stop to passengers.

Figure 8:
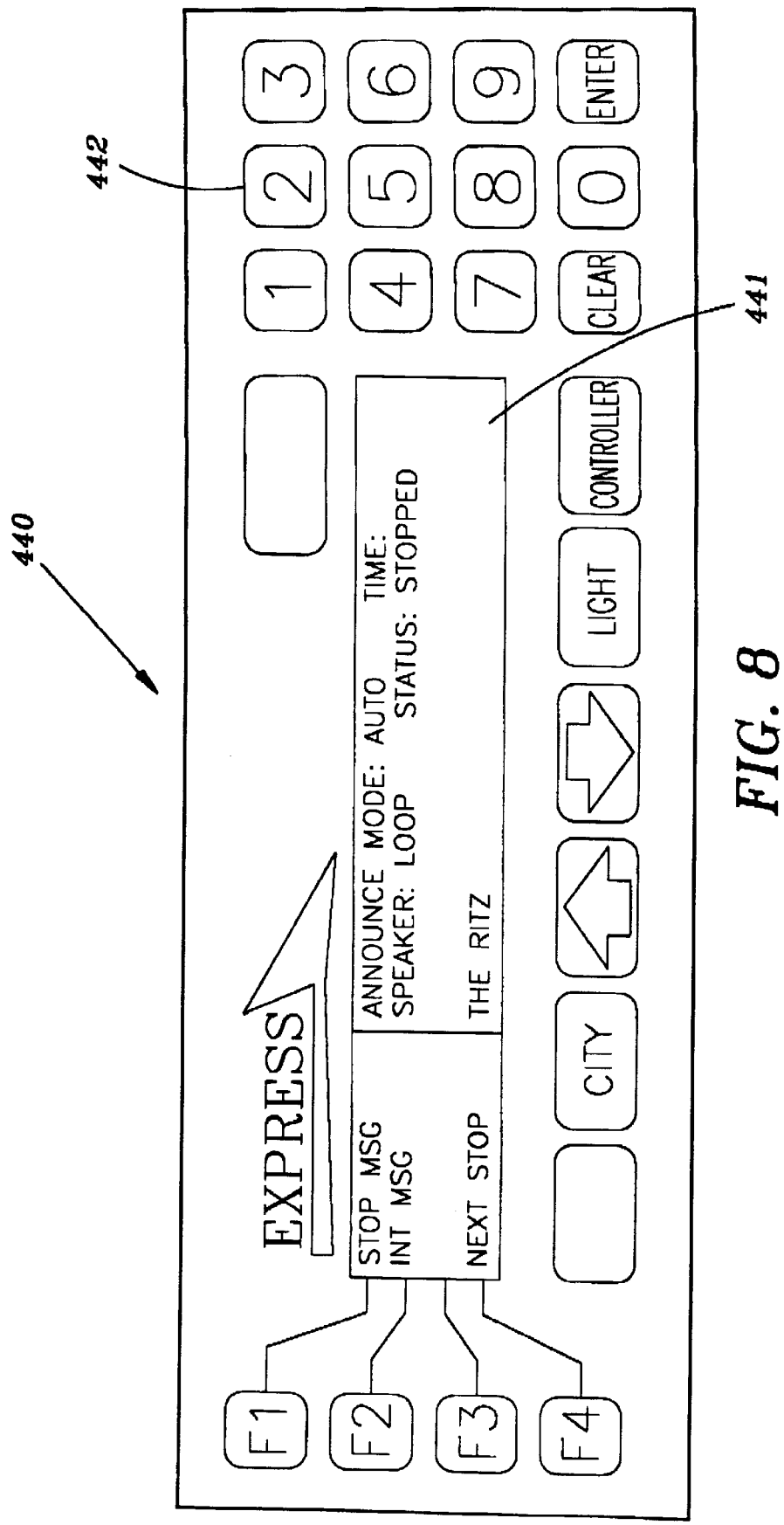
FIG. 8 depicts a typical display and keyboard input of a mobile data terminal employed in the invention.

Preferably, each VTU 400 also includes a mobile data terminal (MDT) 440. A typical MDT 440 employed in the present invention is depicted in FIG. 8.

The MDT 440 includes a visual display 441 for the driver of the vehicle. The MDT 440 can display such information as the name of the present stop and/or the next stop, messages received from the CCC 200, and status information, such as whether the vehicle 600 is stopped, early or late in relation to the schedule for the route. Preferably, the MDT 440 also includes a keyboard 442 or other input device for the driver to transmit messages to the CCC 200, such as the driver's ID number when the driver logs on to the system or requests emergency assistance.

Preferably, messages sent by the VTU 400 to the CCC 200, via the radio modem 410 (such as status information, emergency assistance messages, etc.) are tagged with the time the driver initiates the send command for the message. Because of certain conditions, radio coverage problems may delay transmission of the message from the VTU 400 to the CCC 200 by several minutes. By automatically tagging the message with the time the dispatchers will know whether the message reflects a current message or a delayed message and will be able to take appropriate action.

Preferably, messages to be sent by the VTU 400 are queued in the VTU before transmission. Thus, if a second message is entered before the first message can be transmitted (because of radio coverage problems, for example), the first message will not be lost. Preferably, the CCC 200 will send a message acknowledgement to the VTU 400, confirming that the message has been received. However, this is not necessary.

Figure 2:
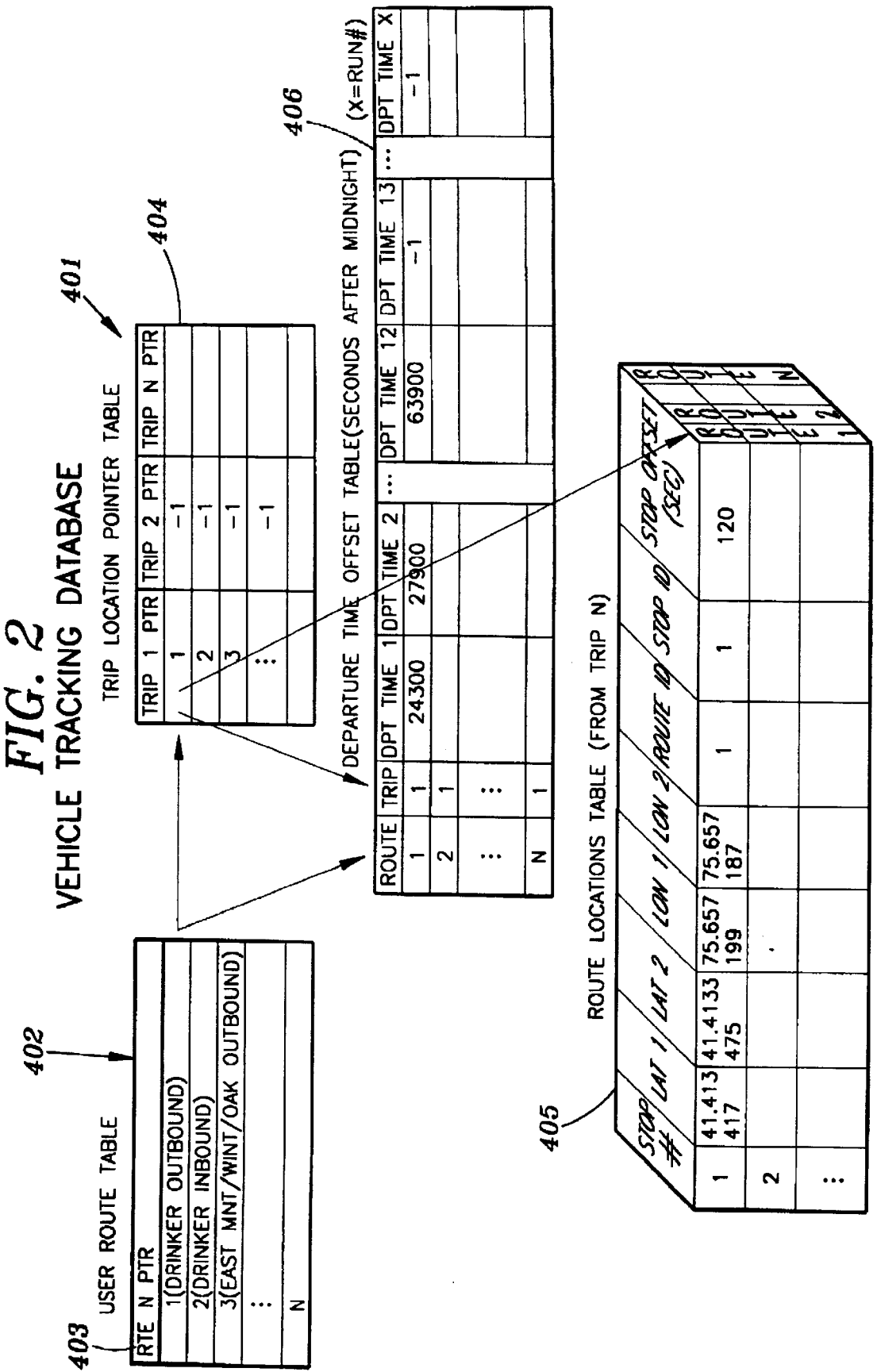
FIG. 2 is a diagrammatic depiction of a vehicle tracking database stored in the RAM of the vehicle tracking unit on each vehicle.

Each VTU 400 includes a suitably programmed microprocessor unit and sufficient RAM for storing all route and schedule information for the entire ALVS 100. A 68HC11 microprocessor and one megabyte of RAM have been found sufficient for this purpose. Preferably, the route and schedule information for all routes, trips, runs and schedules associated with the AVLS 100 system are stored in the RAM of each VTU 400. An example of a vehicle tracking database 401 of the VTU 400 is depicted in FIG. 2. In this way, each vehicle can be used on any route, trip or run simply by identifying the route ID and/or trip ID information at the time the trip is begun.

The VTU 400 provides the information processing and communications functions required by each vehicle in the AVLS 100. The VTU 400 transmits and receives messages associated with the MDT 400, processes the location of the GPS receiver, performs GPS UCT time processing, provides route and destination information to the annunciator 430, transmits reports of the vehicle location to the CCC 200 either continuously or upon request from the CCC, transmits special status reports to the CCC (such as the vehicle being detoured from the normal route, or being early or late in departing etc.), inputs and processes messages from the CCC, including requests from the CCC for the vehicle's location and dispatches messages, receives and processes the correction signal received differential from the base GPS 230 and performs the vehicle's route following/on-time monitoring. In order to provide for uniformity among all the vehicles in the AVLS 100, the clock in each VTU 400, and the CCC 200, are set according to the time signals receives from the global positioning satellites, so that all clocks on all vehicles 600 and the CCC 200 have the same time, as determined by the GPS clock.

The operation of the VTU 400, as it applies to the GPS triggered automatic annunciator 400 of the present invention will now be described. At the beginning of a route, the driver of the vehicle 600 inputs the route ID and a trip number. A "route" corresponds to a particular path to be taken, for example on city streets. Thus, on a city bus, for example, there may be an "OUTBOUND DRINKER STREET" Route, and "INBOUND DRINKER STREET" Route, and an "OUTBOUND EAST MNT/WINT/OAK" route. A "trip" is in the nature of a "subroute", that is, a minor variation on a route, such as scheduled detour during certain scheduled hours, or for express vehicles that skip certain stops, etc. A particular trip number on a particular route normally has most of the same destinations as other trips on the route. There may be several trips for each route, or a route may have only one "trip" associated with it. In the following discussion, a particular route/trip combination may be sometimes referred to as simply a "route".

A "run", as used herein, identifies a particular vehicle beginning at a particular time on a particular route/trip. That is, "OUTBOUND DRINKER STREET" route 1, trip 1, may have 10 "runs" during the day, one scheduled to begin at 10:00 a.m., one scheduled to begin at 11:00 a.m., and so one. The runs can be identified by their initial starting times, also referred to herein as the "base time".

At the beginning of a run on a route/trip, the driver will enter the route ID and trip number into the MDT 440 of the VTU 400 software within the VTU 400 then searches a user route table 402 (stored in the database locally on the VTU) for a "route ID" match. Once a match is found, the route ID is used as an route pointer index 403 a trip location pointer table 404.

Figure 3A:
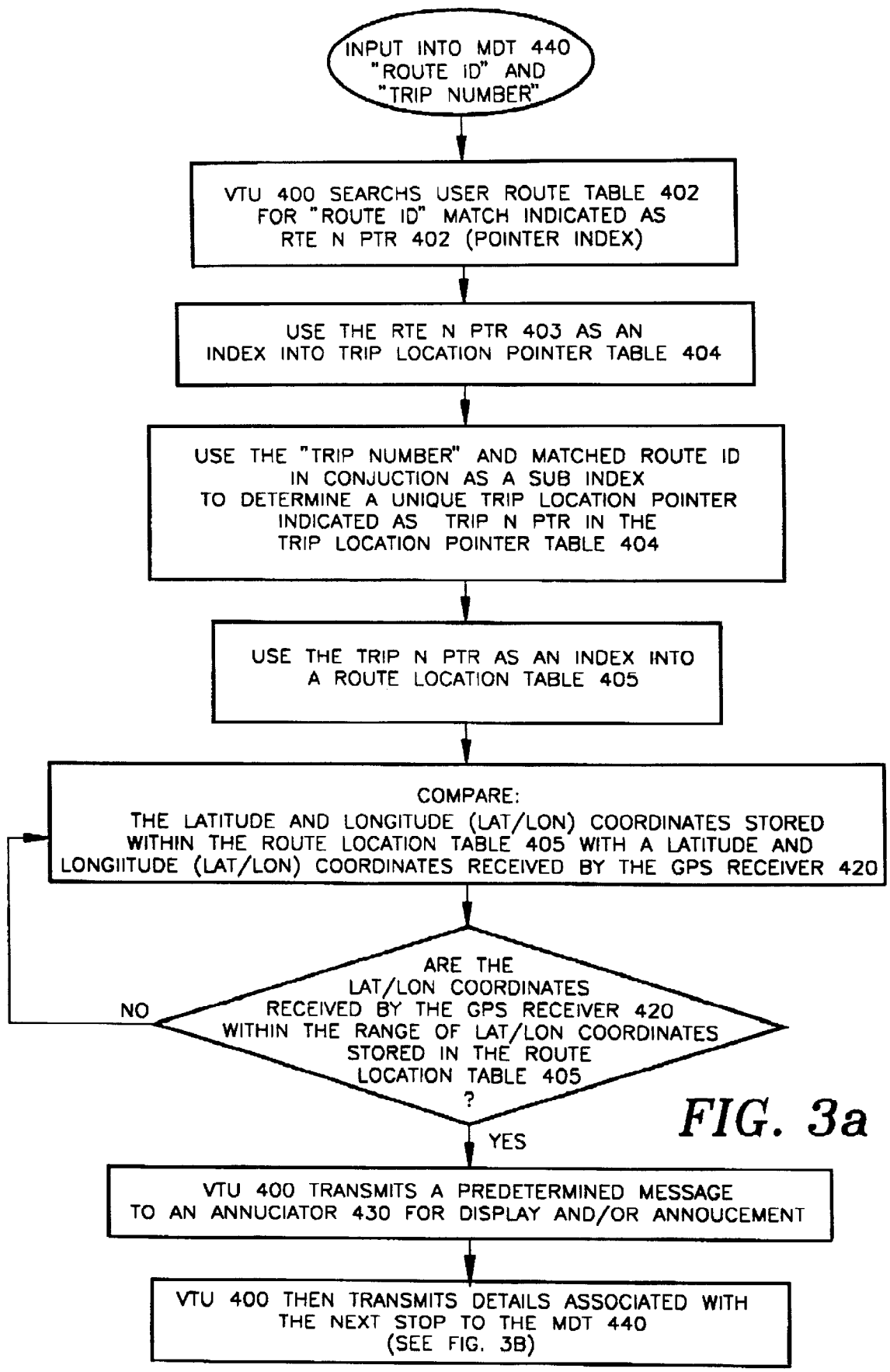
FIG. 3a is a flowchart of the vehicle tracking algorithm applicable to the triggering of the automatic annunciator.
Figure 3B:
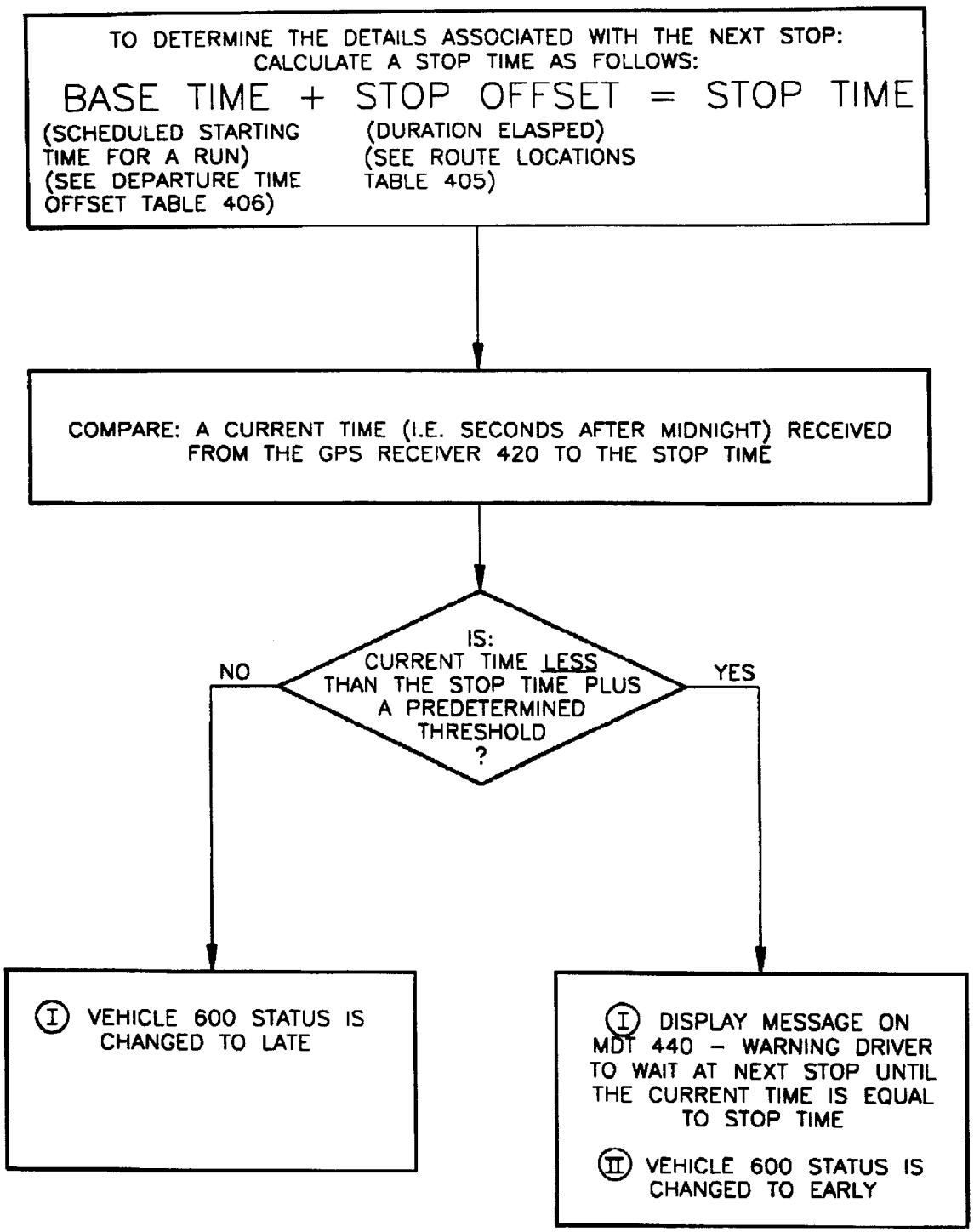
FIG. 3b is a flowchart of the vehicle tracking algorithm applicable to the on-time status display to the driver on the mobile data terminal of the vehicle.

The route pointer index 403, indicated as "RTE n PTR" in FIGS. 2 and 3*a* and 3*b*, functions as an index to the trip location pointer table 404. The "n" in "RTE n PRT" corresponds to the route ID The trip number is used as a sub index to determine a unique trip location pointer. The trip location pointer is used as an index (trip n PRT) into a route locations table 405. The "n" in "TRIP n PRT" corresponds to the trip number. The combination of route ID and trip number form a route/trip combination. Because many routes have only one "trip number" associated with them, the following will sometimes use "route" to mean a particular route/trip combination.

The route locations table 405 contains the following data for each scheduled stop or destination associated with each route ID/trip number pointed to by the trip locations pointers table 404:

1. Latitude/longitude coordinate pairs for each stop on each route ID/trip number combination, including a minimum and a maximum latitude Lat 1 and Lat 2 and a minimum and a maximum longitude Lon 1 and Lon 2 defining the perimeter of a logical "trigger box" for each destination associated with the Route ID.
2. The route ID and a stop ID associated with each stop on the route are used as a pointer by the Annuciator 430 to select the appropriate digitized voice messages and/or alpha-numeric messages stored for each stop on a route and to announce or display the name of the stop to occupants of the vehicle.

3. Stop time offset (also called departure time offset) for each stop on a run is known, beginning from scheduled starting time (also called "base time") for a particular run number. For convenience, rather than store a specific departure time (i.e., 11:23 a.m., for example) for each stop on a run, a stop time offset is stored, corresponding to the scheduled elapsed time in seconds from the scheduled "base time" at the beginning of a run. This tends to simplify computations and accommodates any of periodic schedule changes. However, the actual time of day of the stop could be stored, if desired.

The route and schedule information are stored in the vehicle tracking database 401, preferably arranged as depicted in FIG. 2. The vehicle tracking database 401 includes a user route table 402 having a list of the route ID's. The route pointer index 403 that indexes the route ID's to the trip location pointers table 404, including up to three different "trips" (i.e., variations of a particular route) and to a departure time offset table 406, which lists the scheduled beginning departure times (preferably in seconds after midnight) for each run of each route/trip combination. The trip location pointers table 401 is, in turn, indexed to the route locations table 405.

The route locations table 405 includes min/max latitude Lat 1 and Lat 2 and min/max longitude Lon 1 and Lon 2 data defining each "trigger box" for a corresponding route ID and stop ID that is used for the annunciator 430. Also included in the route locating table 405 is a stop offset element (in seconds) for each scheduled stop of each route (i.e. route/trip combination).

With this database structure, the min/max latitude Lat 1 and Lat 2 and longitude Lon 1 and Lon 2 coordinates that define of the logical "trigger box" for each possible destination associated with the route ID are stored only once in the vehicle tracking database 401 for each route ID. This avoids unnecessary duplication of stored information. If there is more than one trip associated with a given route ID, only the variations from the main route/trip need be stored. This also minimizes duplication of stored information, since most of the stops on a trip variation of a route will still be the same as the main trip on a route.

The "TRIP n PRT" in trip location pointers table 404 indexes which destinations are associated with the particular trip number on the route. Thus, the data defining the "trigger box" on any route may be used by several trip numbers. Of course, each run of a particular route/trip combination will use the same min/max latitude Lat 1 and Lat 2 and min/max longitude Lon 1 and Lon 2 boxes, since the locations of the stops are the same, regardless of the time of travel.

The reason min/max latitude and longitude coordinates are used for each location, instead of simply a single latitude/longitude intersection is that, due to differing conditions on each route (obstructions, orientation of the route, different speed limits, etc.), triggering the automatic annunciator 430 when the GPS 420 indicates that the vehicle is at a single latitude/longitude coordinate (or within a specified fixed distance from it) can give inconsistent results.

Figure 4:
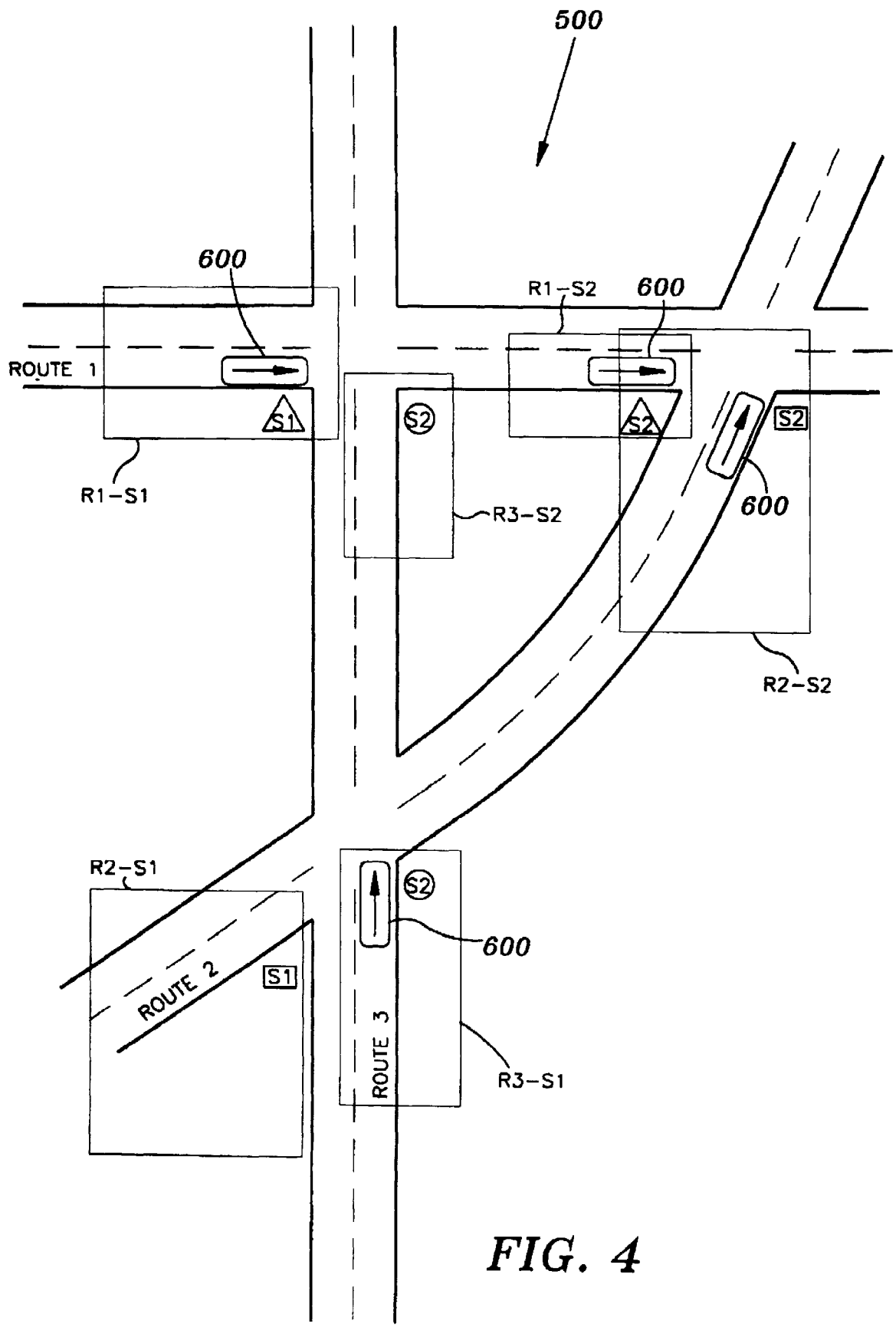
FIG. 4 is a schematic map of a portion of a roadway system including three routes, showing the minimum/maximum latitude/longitude "boxes" used for triggering the automatic annunciator.

A schematic map of a portion of a roadway system 500 including three routes is depicted in FIG. 4. Vehicles 600 on each route are indicated schematically as rounded rectangles with arrows indicating the direction of travel. Two stop locations, S1 and S2 on route 1 are indicated with triangles. On Route 2, two stop locations, S1 and S2 are indicated with rectangle. On Route 3, two stop locations, S1 and S2 are indicated with circles. Each of the stop locations is circumscribed by its associated min/max latitude and longitude "trigger box" R1-S1, R1-S2, R2-S1, R2-S2, R3-S1 and R3-S2, respectively. Of course, the "trigger box" does not physically exist on the roadway, but rather is only a depiction of the min/max latitude Lat 1 and Lat 2 and min/max longitude Lon 1 and Lon 2 coordinates corresponding to the stop location.

As can be seen, not all of the "trigger boxes" are the same size or shape. This allows the size and shape of each "box" to be tailored to the individual requirements of each stop location, if required.

If only a single latitude/longitude intersection were stored for each location, and the annunciator 430 set to trigger when the vehicle 600 was within 10 meters from the intersection, for example, the triggering point for the vehicle traveling on a route having a faster speed limit would be closer to the intersection than for the vehicle traveling on a portion of the route having a slower speed limit. This is because the GPS receiver 420 receives a latitude/longitude location for the vehicle about once per second, and the faster vehicle travels farther in one second than a slower vehicle. It has been found that where the min/max latitude and min/max longitude "trigger box" is stored for each stop, the size of each "trigger box" for each stop can be individually tailored, if necessary. Accordingly, it has been found that storage of min/max latitude Lat 1 and Lat 2 and min/max longitude Lon 1 and Lon 2 coordinates to define a "trigger box" gives more consistent and controllable results. However, if required, a single latitude/longitude intersection could be stored for each stop.

The GPS receiver 420 returns a latitude and longitude coordinate for the vehicle 600 to the VTU 400 approximately once per second. This coordinate is compared to the min/max latitude Lat 1 and Lat 2 and min/max longitude Lon 1 and Lon 2 coordinates stored for each stop in the route locations table 405. If the GPS coordinate is within the limits of a stop location for the route ID/trip number combination (i.e., within the perimeter of the "trigger box" for that stop), the VTU 400 sends the annunciator 430 the route ID and stop number, which then triggers the annunciator to select the digital voice message announcing the name of the appropriate stop. Optionally, the annunciator 430 can also display the name of the stop on an alpha-numeric display visible to the passengers on the vehicle.

After triggering an announcement and/or display of a stop, the VTU 400 flags or cancels that stop number as already having been announced. Thus, if the vehicle 600 backs up, for instance, that stop will not be reannounced. The MDT 440 will also display the text of the next stop for the route ID on its alpha-numeric display 441.

When the vehicle 600 enters the next "trigger box" on the route, its VTU 400 searches the entire list of stop ID's for the appropriate match, rather than simply selecting the next stop on the route. In this way, if the vehicle 600 is detoured from some reason, and misses a stop, the correct next actual stop will be announced when the vehicle arrives at a stop, whether it is the next scheduled stop or not. However, the VTU 400 will search only the list of stops for the route ID entered at the beginning of the route. Thus, if the vehicle 600 enters the "trigger box" for a stop on a different route (such as, for example, when the vehicle passes an intersection), the stop on the other route will be ignored. For example, with reference to FIG. 4, the "box" R2-S2 for stop S2 on route 2 partially intersects the "box" R1-S2 for stop S2 on route 1. However, the annunciator 430 on the vehicle 600 on route 2 at stop S2 will not announce the stop S2 for route 1.

At the end of a route, the announcement message will be reset by the annunciator 430. This is because the vehicle normally turns around at the end of a route, and will still be in the "trigger box". If the message is not reset, the announcement for the last stop can be erroneously made again at the first stop on the next route.

The VTU 400 also can determine the on-time schedule status of the vehicle (i.e., whether the vehicle is on-time, early or late in departing from a stop). To do so, as shown in FIG. 3b, the VTU 400 calculates the stop time as follows: Base Time+Stop Offset=Stop Time. The base time is the scheduled start time of a trip and is the same as the "Dpt Time" in the departure time offset table 403 of FIG. 2. The stop offset in the route locations table 405 of FIG. 2 is the scheduled time of departure from a particular stop number on the route.

To determine the schedule status of the vehicle (i.e., whether it is early, late or on-time), the current UCT (universal coordinate time) is retrieved from the GPS receiver 420 and compared to the scheduled stop time, at the point where the vehicle 600 is determined to be within the correct "trigger box" for that stop. If the current time is less than the stop time, an "early" message is displayed on the MDT 440 warning the driver to wait at the next stop until the current time is equal to the Stop Time. The vehicle status is changed to "Early" and that new status is transmitted to the CCC 200. If the current time is greater than the Stop Time+Threshold (the Threshold being a certain number of seconds of "tolerance"), a status of the vehicle 600 is changed to "Late". The status of the vehicle 600 is reported to the CCC 200 a minimum of once per minute, along with the location of the vehicle 600. Preferably, the MDT 440 does not display a "Late" indication. This is because, normally being "Late" is caused by circumstances beyond the driver's control and a display of this "late" status might be unnecessarily distracting to the driver.

Figure 5:
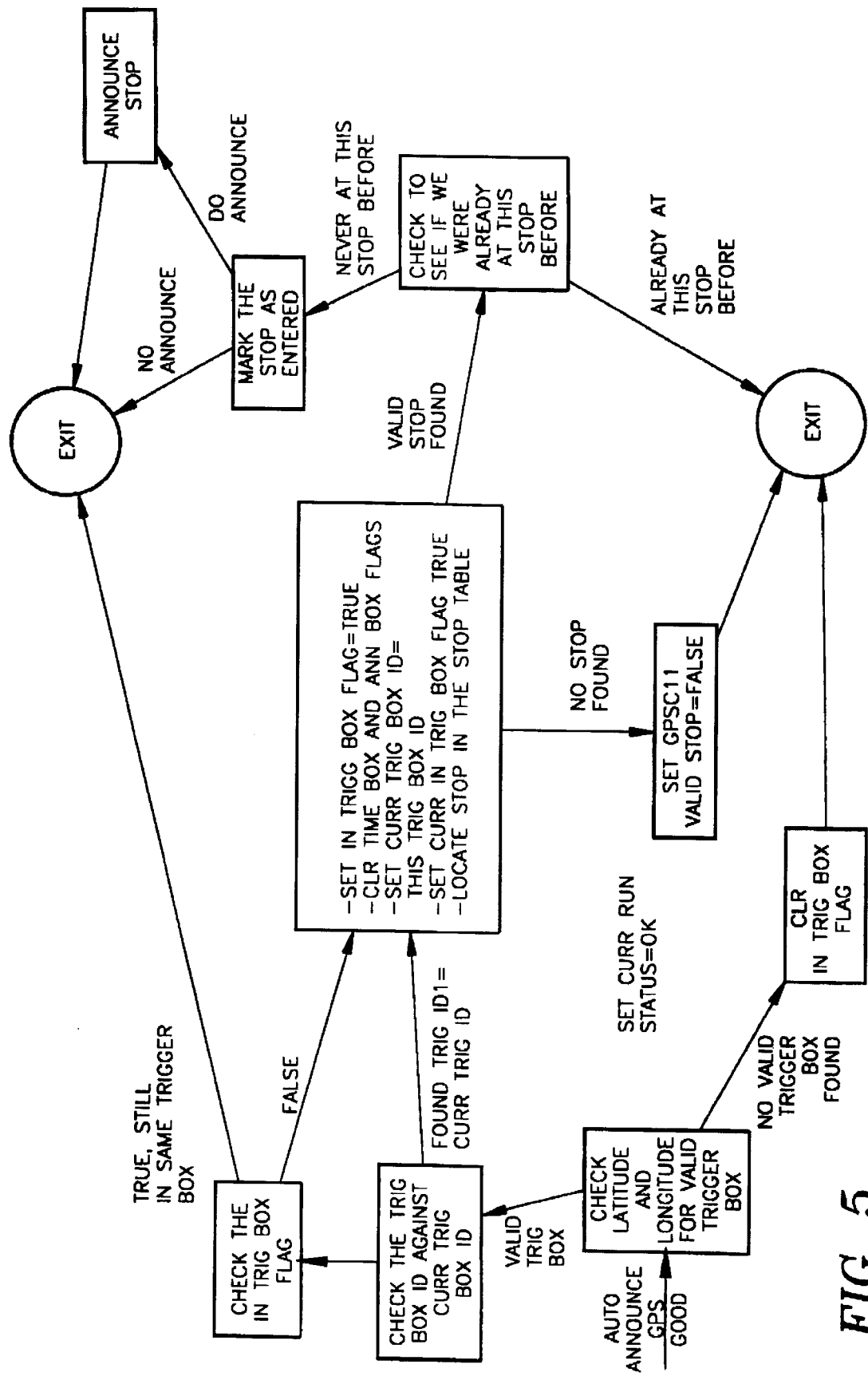
FIG. 5 is a flow chart showing steps performed by the automatic annunciator system of the invention in order to determine when to announce a stop.
Figure 6:
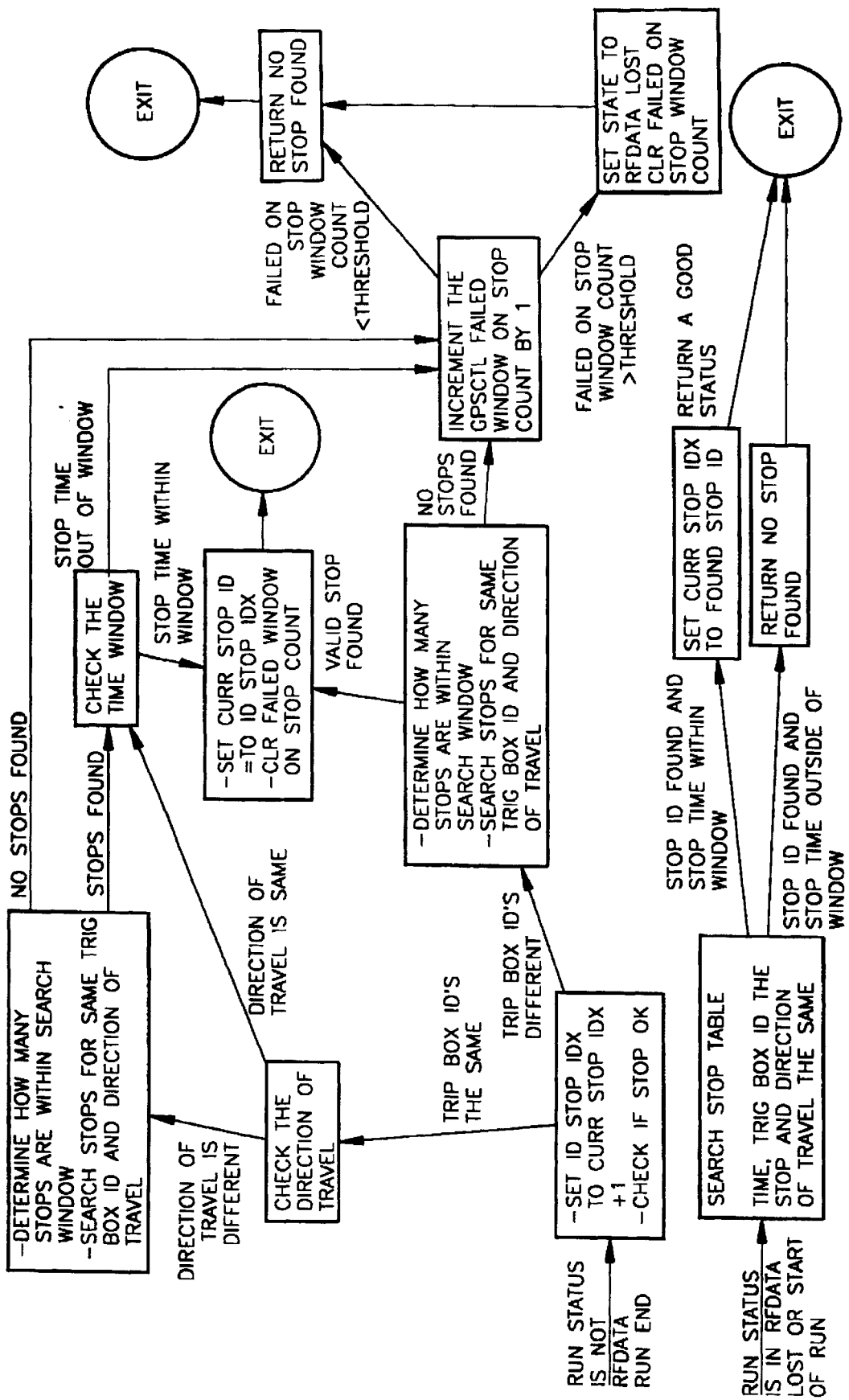
FIG. 6 is a flow chart showing steps performed by the automatic vehicle location system of the invention to determine the identity and validity of a stop.
Figure 7:
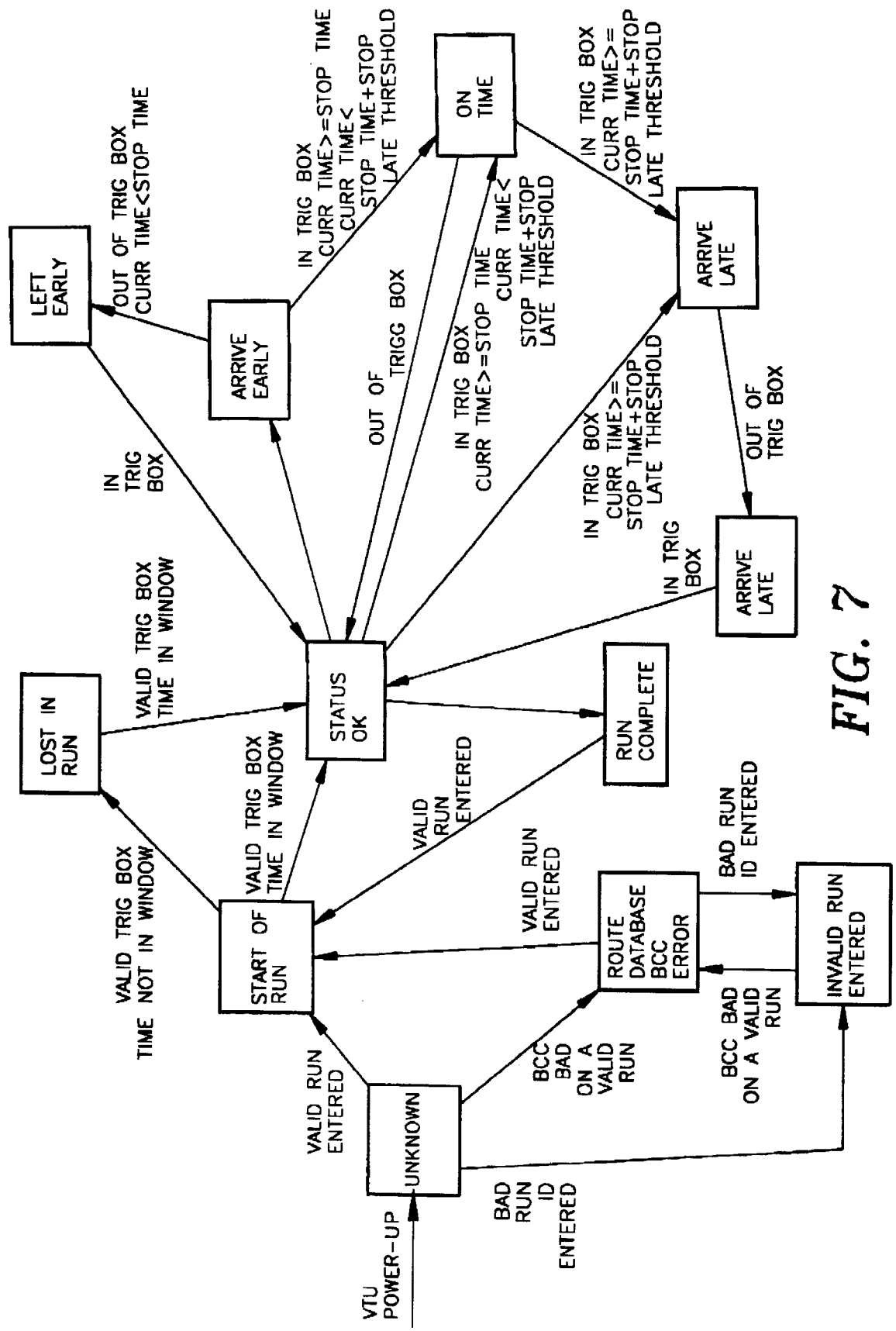
FIG. 7 is a flow chart showing steps performed by the vehicle tracking unit to determine the schedule status of vehicle.

FIG. 5 is a flow chart showing steps performed by the annunciator system 430 of the invention in order to determine when to announce a stop. FIG. 6 is a flow chart showing steps performed by the AVLS 100 to determine the identity and validity of a stop. FIG. 7 is a flow chart showing steps performed by the vehicle tracking unit 400 to determine the schedule status of vehicle 600.

In urban transportation systems, there may be frequent periods of "drop off" of the GPS satellite signals, due to obstruction of the signals from the satellites from buildings, etc. Thus, it is desirable to combine the GPS location information with a supplemental dead reckoning position determination system to more accurately keep track of the actual position of a vehicle 600. In accordance with the present invention, this is accomplished in the following manner.

A sensor on the vehicle's drive shaft, odometer etc. provides a pulse corresponding to wheel rotation, and hence to distance traveled, and inputs this signal to the "odometer/ dead reckoning" input 407 of the VTU 400. Normally, the position of the vehicle is determined by the GPS receiver 420 (when the signal is unobstructed). At the time a good GPS receiver 430 position determination is made, the VTU 400 notes the odometer reading at that GPS-determined position. From the time of that GPS-determined position, and the time the next good GPS receiver determination is made, position of the vehicle 600 is inferred using the differential odometer reading from the time of the last good GPS receiver position.

Of course, a single point (i.e. the last good GPS-determined position) and a differential odometer reading (i.e. a distance) will not fix a new position, unless the direction of travel of the vehicle 600 is known. In prior GPS vehicle position systems, it has been suggested to use a magnetic compass, gyroscope etc. to determine a vehicle direction. However, in the present invention, the direction of travel of the vehicle 600 need not be known directly, since the vehicle's position along the path of the route can be inferred based upon an assumption that the vehicle (1) was on the path of the route at the time the last good GPS receiver position was determined and (2) is still on the path of the route. Although the direction of travel of the vehicle 600 at a particular point in time on a predetermined route need not, itself, be known to determine the schedule status of the vehicle or its position on its expected route, the direction of travel can also be inferred. In this, way, no magnetic compass or gyroscope is required, which would have reliability problems in a public transportation vehicle. Position, accuracy is also increased, particularly in urban environments where satellite signals are frequently obstructed.

Accuracy of vehicle position can also be increased by periodically determining the exact location of the vehicle at a stop. As noted, above, the accuracy of GPS signals, even where corrected, can be as much as 10 meters. In the present invention, the exact location of the vehicle 600 can be periodically fixed at a stop location which is relatively unobstructed and at a major intersection, such that the door will normally be opened to let passengers on or off. This is accomplished as follows, with reference to FIG. 4 and stop S2 of route 2.

Stop S2 is relatively unobstructed, so a good GPS receiver position can be reliably determined each time the vehicle 600 enters the "trigger box". Scheduled public transportation vehicles 600 will normally stop at a particular stop at nearly the exact same point near the curb each time (within a few feet), and then open the door for passengers. In the present system, a sensor 408 tells the VTU 400 that the door has been opened. If the GPS reciever 420 determines that the vehicle 600 is somewhere in the "trigger box" associated with that stop (in this case, box R2-S2 of stop S2 of route 2, the AVLS 100 will assume that the vehicle is exactly at the point of the stop, at the curb. Thus, the determined position of the vehicle 600 will be "locked" very accurately at that position, within a few feet, notwithstanding that the GPS receiver 420 may indicate a position which is inaccurate by as much as 10 meters. Then, the odometer position/dead reckoning system described above can be used to accurately fix the position of the vehicle 600 along the route. The odometer/dead reckoning position along the route will then be used by the AVLS 100 as the actual position of the vehicle 600 (rather then periodically received GPS signals, until a new position can be "locked" at the next unobstructed stop, where the door is opened. The combination of the "locked" stop location with the odometer measurement can be used, in lieu of the GPS signal, unless the expected cumulative errors of the odometer/dead reckoning measurement exceed the expected error of the periodically received GPS signal. In this way, very accurate position information can be determined for the vehicles, at times even more accurate that the GPS signals themselves, even in heavily obstructed urban environments.

Although preferred embodiments of the present invention and modifications thereof have been described in detail herein, it is to be appreciated that this invention is not limited to those precise embodiments and modifications, and that other modifications and variations may be affected by one skilled in the art without departing from the scope and spirit of the invention as defined by the appended claims.

What is claimed is:

1. A vehicle tracking unit for mounting to a vehicle comprising:
   a processor;
   a GPS receiver coupled to the processor, said processor computing approximate latitude and longitude values representing a particular location of a vehicle in response to signals transmitted from a plurality of global positioning satellites;
   a vehicle tracking database coupled to the processor, said vehicle tracking database including a plurality of data tables corresponding to a plurality of destinations each defined by a predetermined maximum and minimum range of latitude and longitude values, and a plurality of route identifications, trip numbers, runs and schedules; and
   an annunciator coupled to the processor for announcing a predetermined message corresponding to the location of the vehicle when the computed vehicle location falls within a predetermined maximum and minimum range of latitude and longitude values defining one of the plurality of destinations.

2. The vehicle tracking unit in accordance with claim 1 further comprising a modem coupled to the processor for receiving and transmitting data therefrom.

3. The vehicle tracking unit in accordance with claim 1 further comprising an odometer sensor coupled to the processor and the vehicle, said odometer sensor transmits to the processor a distance signal indicative of the distance travelled by the vehicle, where the processor performs a computation using the distance signal to increase the accuracy of the approximated latitude and longitude values identifying the location of the vehicle.

4. The vehicle tracking unit in accordance with claim 1 further comprising a door sensor coupled to the processor and the vehicle, said door sensor transmitting a door open signal to the processor when a door of the vehicle opens, where the processor performs a computation using the door signal to increase the accuracy of the approximated latitude and longitude values identifying the location of the vehicle.

5. The vehicle tracking unit in accordance with claim 1 wherein the vehicle tracking database further includes:
   a user route table for storing predetermined route identifications including the specific route identification;
   a trip locations pointer table for storing predetermined trip numbers including the specific route identification input from the trip locations pointer table;
   a departure time offset table for storing scheduled time schedules for the predetermined route identifications and the predetermined trip numbers; and
   a route locations table for storing the predetermined maximum and minimum range of latitude and longitude values and the predetermined message referenced to the specific route identification and the predetermined trip number, said predetermined maximum and minimum range of latitude and longitude values identified with one of the plurality of destinations.

6. The vehicle tracking unit in accordance with claim 1 further comprising a mobile data terminal for inputting into the processor a specific route identification and specific trip number.

7. The vehicle tracking unit in accordance with claim 6 wherein the mobile data terminal further includes:
   means for displaying an EARLY message when the actual stopping time of the vehicle lags a scheduled stop time at a particular location; and
   means for displaying a LATE message when the actual stopping time of the vehicle exceeds the scheduled stop time at the particular location.

8. A vehicle locating system comprising:
   at least one vehicle tracking unit, each tracking unit having an unique identification number corresponding to a particular vehicle, each vehicle tracking unit including:
   a processor;
   a GPS receiver coupled to the processor, said processor computing approximate latitude and longitude values representing a location of the particular vehicle in response to signals transmitted from a plurality of global positioning satellites;
   a vehicle tracking database coupled to the processor, said vehicle tracking database including a plurality of data tables corresponding to a plurality of destinations each defined by a predetermined maximum and minimum range of latitude and longitude values, and a plurality of route identifications, trip numbers, runs and schedules; and
   an annunciator coupled to the processor for announcing a predetermined message corresponding to the location of the particular vehicle when the computed vehicle location falls within a predetermined maximum and minimum range of latitude and longitude values defining one of the plurality of destinations;
   a communications control computer in communication with each vehicle tracking unit and receiving from each vehicle tracking unit the location of the particular vehicle; and
   a map computer subsystem coupled to the communications control computer for displaying information received from the communications control computer.

9. The vehicle locating system in accordance with claim 8 further comprising:
   a data logic controller coupled to the control communications computer for transmitting and receiving information from each vehicle tracking unit;
   a differential base GPS system coupled to the control communication computer for transmitting a correction signal to each GPS receiver; and
   a location database coupled to the control communication computer for providing required route and schedule information for a route system identified with a vehicle locating system.

10. The vehicle locating system in accordance with claim 8 wherein the map computer subsystem further includes:
    means for monitoring the location and status of the vehicles operating in a route system; and
    means for displaying messages transmitted by the vehicle tracking unit from the vehicles operating in the route system.

11. The vehicle locating system in accordance with claim 8 wherein the map computer subsystem further includes:
    a map computer;
    a map database connected to the map computer; and
    a display monitor connected to the map computer for displaying the location and status of the vehicles operating in a route system.

12. The vehicle locating system in accordance with claim 8 wherein the vehicle tracking unit further includes:
    means for displaying an "EARLY" message when the actual stopping time of the vehicle lags a scheduled stop time a particular location; and means for displaying a "LATE" message when the actual stopping time of the vehicle exceeds the scheduled stop time at the particular location.

13. A method for determining the location of a vehicle, comprising the steps of:

inputting into a processor a specific route identification and a specific trip number for one of a plurality of vehicle destinations;

retrieving a predetermined message and a maximum and minimum range of latitude and longitude values from a vehicle tracking database for the specific route identification and the specific trip number;

processing signals transmitted from a plurality of global positioning satellites to approximate latitude and longitude values of the location of a vehicle;

comparing the approximate latitude and longitude values for the location of the vehicle to that of the predetermined maximum and minimum range of longitude and latitude values;

announcing the predetermined message corresponding to the location of the vehicle when the approximate latitude and longitude values fall within the predetermined maximum and minimum range of latitude and longitude values.

14. The method in accordance with claim 13 further comprising repeating each step for additional vehicles for the plurality of destinations.

15. The method in accordance with claim 13 wherein the step of processing further includes the step of updating the approximate latitude and longitude values as the vehicle travels along a specific route.

16. The method in accordance with claim 13 further comprising the step of determining the distance traveled by the vehicle by means of an odometer sensor, and combining the distance traveled with the approximated latitude and longitude values to improve the accuracy thereof.

17. The method in accordance with claim 13 further comprising the step of improving the accuracy of the approximated latitude and longitude values of the vehicle by utilizing a door signal transmitted by a door sensor that actuates when a door of the vehicle opens.

18. The method in accordance with claim 13 further comprising the step of displaying a "LATE" message when a current time value exceeds a stop time value, and displaying an "EARLY" message when the current time value lags the stop time value.

19. The method in accordance with claim 18 wherein the step of displaying further includes the steps of:

retrieving the current time from universal coordinate time signals transmitted from the global positioning satellites;

retrieving a base time and a stop offset time from the vehicle tracking database; and calculating the stop time by adding the base time and the stop offset time.

20. The method in accordance with claim 13 further comprising:

interfacing the processor with a communication control computer located remotely; and displaying the location and a status of the vehicle.

21. The method in accordance with claim 20 wherein the step of interfacing further includes a step of improving the accuracy of the approximated latitude and longitude values associated with the vehicle by utilizing a GPS differential base connected to the communication control computer.

22. An apparatus for automatically announcing the arrival status of a vehicle to occupants of the vehicle, comprising:

a data base for storing route identification, trip identification, and destination identification for at least one predetermined route, said destination information including for each destination at least a destination number, destination name, and a set of first and second latitude and first and second longitude coordinates defining a logical box associated with each destination;

means for storing digital information corresponding to an announcement for each said destination;

a data terminal for inputting an intended route and trip identification at a starting point of the intended route and trip;

means including a GPS receiver for determining the present position of the vehicle in latitude and longitude coordinates;

a processor for determining when the present position of the vehicle in latitude and longitude coordinates falls within a particular logical box of a destination on the predetermined route and selecting the digital information corresponding to an announcement for the destination identified with the logical box; and an annunciator for outputting the announcement to the occupants of the vehicle.

23. The apparatus defined in claim 22, wherein said annunciator comprises a visual digital display.

24. The apparatus defined in claim 22, wherein said annunciator comprises an audio announcement means.

25. The apparatus defined in claim 22, further comprising means for storing scheduling information including at least a scheduled stop time associated with each destination on a route, means for determining a present time, means for comparing the present time to the stop time associated with a destination when the present position of the vehicle falls within the logical box corresponding to a destination, and a monitor for displaying an "EARLY" indication or a "LATE" indication based upon the comparison between the present time and the stop time.

26. The apparatus defined in claim 25 including a communication link for transmitting the "EARLY" indication or the "LATE" indication to a central communications center.

27. The apparatus defined in claim 25 further including means in communication with a central communication center for periodically resetting the present time to a present time determined by the central communication center.

* * * * *